United States Patent Office 3,202,631
Patented Aug. 24, 1965

---

3,202,631
STABILIZING POLYURETHANES WITH TETRA ALKYL GUANIDINES
Ernest E. Fauser, Cuyahoga Falls, Ohio, assignor to The Goodyear Tire & Rubber Company, Akron, Ohio, a corporation of Ohio
No Drawing. Filed Oct. 16, 1961, Ser. No. 145,502
16 Claims. (Cl. 260—45.9)

This invention relates to a process for stabilizing polyurethane elastomers within a Mooney plasticity range suitable for processing on a mill. More particularly, this invention relates to a method for preventing the uncontrolled post curing of a polyurethane elastomer.

Although polyurethane elastomers have many superior properties which contribute to their wide use, the deleterious property of post curing exhibited by processible polyurethane elastomers materially limits the usefulness of an aged polyurethane gum stock for some purposes since an aged elastomer may not respond to milling and forming into shaped articles, such as tires, belts, etc. Thus, the polyurethane gum stocks have to be used immediately after the formation of polyurethane by the process of reacting a reactive hydrogen-containing compound with about a stoichiometric amount of an organic polyisocyanate. If this is not done the polyurethane gum stock will continue to cure even at room temperature until its Mooney plasticity values become so high that it is not responsive to milling and shaping of the rubber in a manner customarily required to build tires, belts, hose, etc. Heretofore the freshly prepared polyurethane gum stocks having Mooney plasticity values ML of 50 to 90 and Olsen flow values at 212° F. and 500 p.s.i. of 100 to 200 seconds per inch have been immediately sheeted and the sheeted material was stabilized by means of a post treatment with chemicals such as ammonia, phenol, ethyl alcohol, etc. which destroyed the excess polyisocyanate. Where a stabilization treatment with chemicals such as ammonia, phenol, ethyl alcohol, etc. is used, normally two to four times the equivalent amount of free isocyanate present is required to yield adequate stabilization.

Accordingly, it is a principal object of this invention to provide another means for stabilizing or preventing uncontrolled post curing of the freshly prepared polyurethane gum stock wherein the amount of chemical stabilizer used need be no more than about ten to eighty percent of the equivalent amount of the free isocyanate present.

Another object of this invention is to provide a process for preparing polyurethane gum stock which allows a wider range of ratios between the reactive hydrogen-containing compound and the polyisocyanate to be used and yet allows greater flexibilities in the preparation of the polyurethane gum stock.

Other objects of this invention will be apparent from the following discussion of the various aspects of this invention.

The objects of this invention may be achieved by forming polyurethane elastomers by reacting a reactive hydrogen-containing compound with substantially a stoichiometric amount of polyisocyanate and then heat treating to cure said reaction product to obtain the desired Mooney plasticity values required to permit the gum stock to be milled and otherwise processed and then adding thereto sufficient of the tetra alkyl guanidine to obtain the desired stabilization of this gum stock. Usually about 0.1 to 1 part of the tetra alkyl guanidine per hundred parts of the polyurethane elastomer is sufficient to stabilize the polyurethane elastomer within the processible range, i.e. within the Olsen flow values of about 100 to 300 seconds at 212° F. and 500 pounds per square inch pressure. The preferred range of treatment is .2 to .6 part per hundred parts.

The alkyl groups of the tetra alkyl guanidine can be methyl, ethyl, propyl, butyl, pentyl, hexyl, heptyl, octyl, nonyl, decyl and higher even but usually those alkyl radicals including the branched ones having from 1 to 10 carbon atoms function to give the desired degree of stabilization without side effects.

In general the reactive hydrogen-containing compound is preferably reacted with a slight excess of an organic polyisocyanate to give the desired polyurethane elastomer, although normally millable gum stocks are obtained at a reactive hydrogen-containing compound to organo polyisocyanate ratio of about 0.98 to 1.03. If the ratio of reactive hydrogen-containing compound to polyisocyanate exceeds these limits the resulting elastomer may be too soft or too hard to be successfully processed in conventional rubber processing equipment even when first made and baked. Applicant has discovered that if about one-tenth to about one part of the tetra alkyl guanidine for each hundred parts of gum stock is added to the gum stock, the gum stock remains within the processible range for 30 days or more.

Once the reactive hydrogen-containing compound has reacted with the polyisocyanate to give a viscous but pourable reaction product, it is heated in an oven at temperatures of about 100 to 110° C. until the elastomer develops the desired Mooney plasticity and Olsen flow values. Then the heat treatment is stopped and the polyurethane elastomer which is within the processible range has intimately incorporated therein by any suitable means such as milling in a rubber or paint mill or in a Banbury about .1 to 1 part of tetra alkyl guanidine per hundred parts of said elastomer. Then this gum stock may be stored until it is needed without exhibiting an appreciable increase in either the Mooney plasticity or Olsen flow.

The reactive hydrogen-containing compound may be a polyfunctional compound having a molecular weight of about 700 to 6000 and selected from the class consisting of the polyester glycols, polyether glycols and polyesteramides. The polyesters useful in this invention may be prepared by reacting an excess of a polyol with a polycarboxylic acid to give an esterification product which has a carboxyl number preferably less than about 5 and a hydroxyl number of from 20 to about 150 milligrams of KOH per gram of polyester. Some trifunctional or higher polyols can be used, too.

Representative examples of suitable glycols for use in preparing polyester glycols and polyesteramides are ethylene glycol, propylene glycol, tetramethylene glycol, and hexylene glycol. Representative examples of suitable dicarboxylic acids for use in the preparation of polyester glycols and polyesteramides are succinic, adipic, malonic, suberic, phthalic, terephthalic, isophthalic, sebacic and isosebacic acid. In general, the polyesters useful in this invention should have a molecular weight of about 700 to 5000 with the preferred molecular weight being 1000 to 2500. The polyesteramides are prepared by replacing at least a part of the glycol or dicarboxylic acids with a diamine or an amine alcohol or acid.

Representative examples of suitable polyether glycols useful in this invention are polyethylene ether glycol, polypropylene ether glycol, polytetramethylene ether glycol and mixtures of these glycols as well as copolymers thereof. Included with copolymers are polyethers of tri- and higher functional polyols. The preferred range of molecular weight of these polyether glycols or polyols is from about 1000 to 2500 but those polyether glycols having a molecular weight of about 700 to 5000 may be used, too.

Where the processible polyurethanes are to be cured with a sulfur recipe it is essential that they contain unsaturation preferably of the pendant ethylenic type. Some rubber technologists say that at least one ethylenic double bond for at least every 8000 units of molecular weight of the elastomer is sufficient to obtain beneficial effects by sulfur curing. Generally, it is desired that at least one pendant ethylenic double bond be present for at least each 5 to 6000 units of the elastomer molecular weight. Reactive hydrogen containing polymeric materials suitable for preparing processible gum stocks containing pendant ethylenic double bonds in those amounts needed for sulfur curing, are described in U.S. Patent No. 2,808,391 and in U.S. patent application Serial No. 711,147, filed January 27, 1958, now Patent No. 3,043,807. The reactive hydrogen containing materials described in these two references may be used to make the pendantly unsaturated processible polyurethanes which are sulfur curable and which may be stabilized with tetra alkyl guanidines.

Although it is known that any polyisocyanate may be employed to yield polyurethane elastomers, it is also realized that where the polyisocyanate is trifunctional the resulting polyurethane elastomer tends to be boardy and almost unresponsive to milling and processing in a manner conventionally associated with the fabrication of rubbery products. Thus, although the poly alkyl guanidine of this invention will have a beneficial effect on polyurethane elastomers prepared using trifunctional polyisocyanates or trifunctional reactive hydrogens containing polymers, it should not be expected that they would be able to overcome the greater crosslinking ability inherent in the use of tri- and higher functional reagents. Consequently, the preferred embodiment of this invention relates to the use of tetra alkyl guanidines with organo diisocyanates, and the difunctional reactive hydrogen-containing polymers. Illustrated examples of said diisocyanates are trimethylene diisocyanate; tetramethylene diisocyanate; pentamethylene diisocyanate; hexamethylene diisocyanate; decamethylene diisocyanate; cyclopentylene 1,3-diisocyanate; 1,4-diisocyanate cyclohexane; p-phenylene diisocyanate; m-phenylene diisocyanate; tolylene diisocyanates; naphthalene diisocyanates; 4.4'-diphenyl propane diisocyanate; 4,4'-diphenylmethane diisocyanate; tolidine diisocyanate; diphenyl sulfone, 4,4'-diisocyanate; etc.

It should be apparent to those skilled in the art that various additives, accelerators, compounding ingredients, reinforcing agents, pigments, etc. may be compounded with the polyurethane elastomers of this invention without departing from the scope thereof.

To specifically illustrate a preferred embodiment of this invention with a polyether glycol, a poly tetramethylene ether glycol having a molecular weight of between 1800 and 4000 and at least one pendant ethylenic double bond was reacted with 1.03 ratios of tolidine diisocyanate. This formulation gives a product having a potential Olsen flow value of 522, but when the oven baked product has incorporated therein a tetra alkyl guanidine in the above amounts, it has an Olsen flow of less than about 200 and is readily millable and processible even after storage for several months. Thus, this gum stock could be accumulated and stored until needed for processing into tires, belts and hose.

Similar stabilization results were obtained when the polyesters or polyesteramides were used instead of the polyether as will be shown in greater detail in the following examples which according to the process of this invention are submitted solely for the purpose of illustration and are not to be construed as limiting the invention in any way. In these examples, all parts are by weight unless otherwise designated.

*Example I*

Five hundred parts of a dry polyester was placed in a two-liter resin reaction kettle equipped with a stirrer and a thermometer. This polyester was formed by reacting a mixture consisting of 85 parts of ethylene glycol and 15 parts of glycerol allyl ether with adipic acid to obtain an esterified product having a molecular weight of about 1855. Tolidine diisocyanate in the amount of 75 parts was added to the kettle which was maintained under a nitrogen atmosphere. The contents of the kettle had a temperature of 70° at the time the tolidine diisocyanate was added. The heat of reaction raised the tempearture to 85° C. at which time the reaction mixture was discharged into a tray and covered with an aluminum plate to exclude air. The reaction mixture was heated at 100° C. until the plasticity reached an Olsen flow at 212° F. and 500 pounds per square inch of 19 seconds per inch. Then the reaction mixture was divided into two parts; one part was kept as the control and the other part was treated with 1,1,3,3-tetramethyl guanidine at the rate of .31 part per hundred parts of polymer. The 1,1,3,3-tetramethyl guanidine was mixed into the gum stock on a 2-roll rubber mill. The two samples then were stored at room temperature and the following test observations were made:

| Initial, days | Untreated,* 191 sec./inch flow | Treated,* 164 sec./inch flow |
| --- | --- | --- |
| 7 | 1,000 | 171 |
| 30 | 1,000 | 182 |
| 180 | 3,000 | 167 |

*As determined by the Olsen flow test.

The untreated polymer contained six mol percent more diisocyanate than the amount theoretically needed to attain the desired plasticity. The 1,1,3,3-tetramethyl guanidine added was equivalent to 50% of the excess tolidine diisocyanate.

*Example II*

A processible polyurethane gum stock was prepared by the procedure of Example I with the following recipe:

Seven hundred fifty grams of dry 85/15 ethylene glycol-glycerol alpha allyl ether adipate of about 1800 molecular weight; 108.8 parts of tolidine diisocyanate and 1.9 parts of phenyl beta naphthylamine. This processible gum stock had an Olsen flow of 106 seconds per inch. The gum stock was divided into 3 equal parts. One part was kept as the control and the other two parts were treated respectively with .14 and .28 part of 1,1,3,3-tetramethyl guanidine. On storage at room temperature the following results were obtained:

| Initial, days | Control, 106 sec./in. flow | 0.28 part,[1] 77 sec./in. flow | 0.14 part,[1] 108 sec./in. flow |
| --- | --- | --- | --- |
| 7 | 3,000 | 207 | 364 |
| 30 | 1,200 | 126 | 267 |

[1] 1,1,3,3-tetramethyl guanidine.

The untreated polymer contained five mol percent of excess diisocyanate. The 1,1,3,3-tetramethyl guanidine added was equivalent to 50% and 25% of this excess tolidine diisocyanate.

The reason for the treated samples having a lower Olsen flow than the initial is primarily due to breakdown of the polymer during the milling.

While certain representative embodiments and details have been shown for the purpose of illustrating the invention, it will be apparent to those skilled in this art that various changes and modifications may be made therein without departing from the spirit of scope of the invention.

What is claimed is:

1. In a process for obtaining a stabilized polyurethane elastomer wherein a reactive hydrogen containing compound of about 700 to 6000 molecular weight and selected from the class consisting of polyesters, polyether polyols and polyesteramides, is reacted with substantially an equivalent amount of an organic diisocyanate to form a polyurethane elastomer and is then heat treated to give a product which is processible, the improvement comprising incorporating within the heat treated product from about one-tenth to one part of a tetra alkyl guanidine per hundred parts of elastomer by weight.

2. The process of claim 1 wherein the tetra alkyl guanidine has alkyl groups having less than about 10 carbon atoms.

3. The process of claim 1 wherein the tetra alkyl guanidine is 1,1,3,3-tetramethyl guanidine.

4. The process of claim 2 wherein the reactive hydrogen containing compound is a polyester glycol.

5. The process of claim 2 wherein the reactive hydrogen containing compound is a polyester polyol.

6. The process of claim 3 wherein the reactive hydrogen containing compound is a polyether glycol.

7. The process of claim 3 wherein the reactive hydrogen containing compound is a polyester glycol.

8. In a process for obtaining a stabilized polyurethane elastomer wherein a reactive hydrogen containing compound of about 700 to 6000 molecular weight and selected from the class consisting of polyesters, polyether polyols and polyesteramides is reacted with 0.98 to 1.03 mol equivalents of an organo-diisocyanate to form a polyurethane elastomer and is then heat cured to obtain a cured stock having an Olsen flow value at 212° F. and 500 pounds per square inch of about 100–200 seconds per inch, the improvement comprising incorporating within said elastomer about one-tenth to one part of a tetra alkyl guanidine per hundred parts of elastomer by weight.

9. The process of claim 8 wherein the tetra alkyl guanidine has alkyl groups having less than about 10 carbon atoms.

10. The process of claim 8 wherein the tetra alkyl guanidine is 1,1,3,3-tetramethyl guanidine.

11. The process of claim 9 wherein the reactive hydrogen containing compound is a polyether glycol.

12. The process of claim 9 wherein the reactive hydrogen containing compound is a polyester.

13. The process of claim 10 wherein the reactive hydrogen containing compound is a polyether glycol.

14. The process of claim 10 wherein the reactive hydrogen containing compound is a polyester.

15. In a process for obtaining a stabilized polyurethane elastomer wherein a reactive hydrogen containing compound of about 700 to 6000 molecular weight and selected from the class consisting of polyesters, polyether polyols and polyesteramides is reacted with 0.98 to 1.03 mol equivalents of an organo-diisocyanate to form a polyurethane elastomer and is then heat cured to obtain a cured stock having an Olsen flow value at 212° F. and 500 pounds per square inch of about 100–200 seconds per inch, the improvement comprising incorporating within said elastomer about 10 to 80% by weight of a tetra alkyl guanidine based on the organo-diisocyanate present in excess of that equivalent to the reactive hydrogen containing compounds.

16. The process of claim 15 wherein the tetra alkyl guanidine is 1,1,3,3-tetramethyl guanidine.

No references cited.

LEO J. BERCOVITZ, *Primary Examiner.*

MILTON STERMAN, *Examiner.*